US012183524B2

(12) United States Patent
Monka

(10) Patent No.: US 12,183,524 B2
(45) Date of Patent: Dec. 31, 2024

(54) ELECTRICAL SWITCHING ARRANGEMENT

(71) Applicant: Siemens Energy Global GmbH & Co. KG, Munich (DE)

(72) Inventor: Roland Monka, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 151 days.

(21) Appl. No.: 17/910,887

(22) PCT Filed: Feb. 11, 2021

(86) PCT No.: PCT/EP2021/053300
§ 371 (c)(1),
(2) Date: Sep. 12, 2022

(87) PCT Pub. No.: WO2021/180413
PCT Pub. Date: Sep. 16, 2021

(65) Prior Publication Data

US 2023/0118886 A1 Apr. 20, 2023

(30) Foreign Application Priority Data

Mar. 10, 2020 (DE) ..................... 10 2020 203 029.4

(51) Int. Cl.
*H01H 33/66* (2006.01)
*H01H 33/56* (2006.01)
*H01H 33/91* (2006.01)

(52) U.S. Cl.
CPC ............ *H01H 33/91* (2013.01); *H01H 33/56* (2013.01); *H01H 2033/566* (2013.01)

(58) Field of Classification Search
CPC ........ H01H 33/91; H01H 33/90; H01H 33/56; H01H 33/022; H01H 33/22;
(Continued)

(56) References Cited

U.S. PATENT DOCUMENTS 3,544,747 A * 12/1970 Boersma ................ H01H 1/021
218/85
3,588,407 A 6/1971 Frink et al.
(Continued)

FOREIGN PATENT DOCUMENTS

DE 102013205945 A1 10/2014
DE 102016219812 A1 4/2018
(Continued)

OTHER PUBLICATIONS

Translation of DE102017212740 (Original document published Jan. 31, 2019) (Year: 2019).*

*Primary Examiner* — William A Bolton
(74) *Attorney, Agent, or Firm* — Laurence A. Greenberg; Werner H. Stemer; Ralph E. Locher

(57) ABSTRACT

A switching arrangement has a plurality of at least two contact arrangements and a blasting arrangement for blasting the contact arrangements with insulation gas. The at least two contact arrangements each have a first contact piece and a second contact piece which can be moved relative to one another in order to form an electrical connection when the first contact piece and the second contact piece are in contact and to form an insulation zone when the contact pieces are isolated from one another. The blasting arrangement has at least two blowing volumes, wherein a first contact arrangement can be supplied with insulation gas by a first blowing volume and wherein a second contact arrangement can be supplied with insulation gas by a second blowing volume.

15 Claims, 1 Drawing Sheet

(58) Field of Classification Search
CPC .. H01H 33/7015; H01H 33/86; H01H 33/884; H01H 2033/566; H01H 2033/907; H02B 7/01; H02B 13/0352; H02B 13/035
USPC ....... 218/146, 13, 23, 47, 55, 57, 59, 60, 69
See application file for complete search history.

(56) References Cited

U.S. PATENT DOCUMENTS

| | | | | | |
|---|---|---|---|---|---|
| 3,987,262 | A | * | 10/1976 | Rostron | H01H 33/884 218/60 |
| 4,139,753 | A | * | 2/1979 | Cromer | H01H 33/91 218/65 |
| 4,224,490 | A | * | 9/1980 | Frind | H01H 33/7023 218/54 |
| 4,434,336 | A | * | 2/1984 | Garzon | H01H 33/903 218/116 |
| 4,663,504 | A | | 5/1987 | Barkam | |
| 4,841,108 | A | * | 6/1989 | Hamm | H01H 33/91 218/59 |
| 5,293,014 | A | * | 3/1994 | Perret | H01H 33/905 218/57 |
| 10,796,869 | B2 | | 10/2020 | Monka et al. | |
| 2016/0049269 | A1 | | 2/2016 | Gorablenkow et al. | |

FOREIGN PATENT DOCUMENTS

| | | | | | |
|---|---|---|---|---|---|
| DE | 102016226034 | A1 | | 6/2018 | |
| DE | 102017212740 | | * | 1/2019 | H01H 33/70 |
| EP | 0433183 | A1 | | 6/1991 | |
| EP | 3309810 | A1 | | 4/2018 | |
| WO | WO 2018114204 | A1 | | 6/2018 | |

* cited by examiner

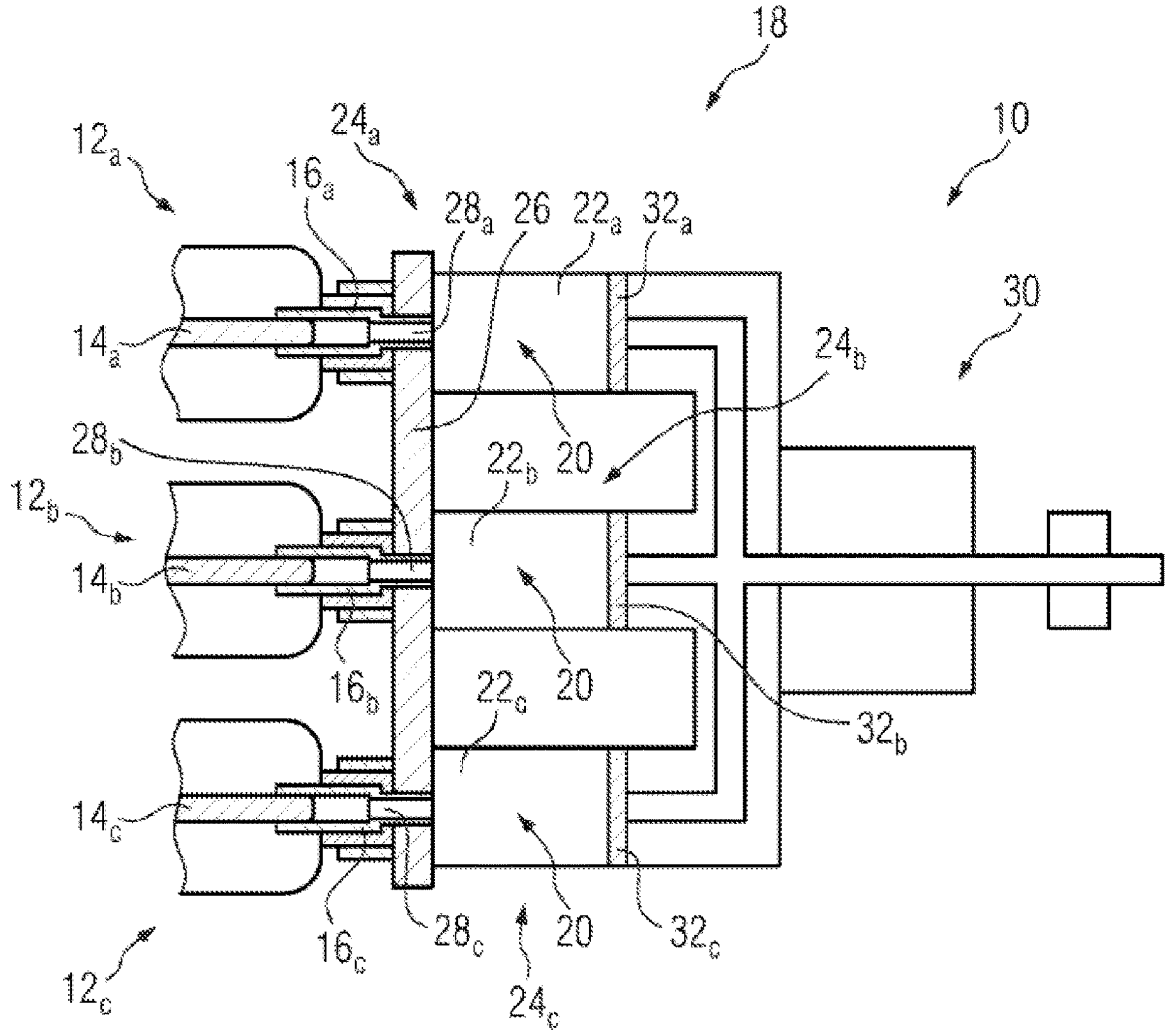
18
10
30
12a
24a
16a
28a
26
22a
32a
24b
14a
20
28b
22b
12b
14b
16b
20
22c
32b
14c
16c
28c
20
32c
12c
24c

ELECTRICAL SWITCHING ARRANGEMENT

FIELD AND BACKGROUND OF THE INVENTION

The present invention relates to an electrical switching arrangement such as in particular an electrical isolating switching device. The present invention relates in particular to an isolating switching device which enables improved gas insulation of an isolating gap between two contact pieces.

There are a large number of known electrical isolating switching devices. They are usually used to isolate high currents. Isolating switching devices of this type usually comprise a first contact piece and a second contact piece which are arranged so they can move relative to each other and can be isolated from each other in an isolation zone or can be arranged so that they contact each other.

It is moreover known, in order to improve gas insulation, to flow an insulating gas, which is provided in a reservoir, around the contact pieces. Flowing gas around the contact pieces in this way can take place and/or be required in particular when isolating the contact pieces.

WO 2018/114204 A1 and DE 10 2016 226 034 A1, for example, describe an electrical switching device having a first switching contact piece and a second switching contact piece, wherein the switching contact pieces can move relative to each other and the first switching contact piece is surrounded by a fluid flow guidance device, wherein the fluid flow guidance device surrounds the cylindrical surface of the first switching contact piece in such a way that an envelope contour of a flow channel delimited between the fluid flow guidance device and the first switching contact piece is larger at least at its end facing the second switching contact piece than the envelope contour of the first switching contact piece at its end facing the second switching contact piece.

EP 3 309 810 A1 and DE 10 2016 219 812 A1 describe a switching arrangement having a blasting device and a first switching contact with a first and a second switching contact piece. A switching gap extends at least temporarily between the switching contact pieces. The blasting device serves both the first switching contact and a second switching contact.

DE 10 2013 205 945 A1 describes an isolating switching device with a first contact piece and with a second contact piece which can move relative to each other and between which an isolation zone is formed in the separated state, said zone being equipped with a compression device with a compression space for receiving a fluid. The compression space projects at least temporarily into the isolation zone.

Such solutions known from the prior art can, however, offer even more potential for improvement, in particular with respect to at least a simple structure and defined and reliable operation of an electrical isolating device.

SUMMARY OF THE INVENTION

The object of the present invention is to overcome the disadvantages known from the prior art at least partially. The object of the present invention is in particular to provide a solution by means of which, at least to a certain extent, an electrical switching arrangement with a simple structure and defined and reliable operation can be provided.

The object is achieved according to the invention at least to a certain extent by an electrical switching device having the features of the independent switching device claim. The object is moreover achieved according to the invention at least to a certain extent by gas-insulated switchgear having the features of the independent switchgear claim. Preferred embodiments of the invention are described in the subclaims, the description, or the drawings, wherein further features described or shown in the subclaims or in the description or the drawings can individually or in any desired combination represent a subject of the invention, unless it is clear from the context that the contrary applies.

A switching arrangement with a plurality of at least two contact arrangements and a blasting arrangement for blasting the contact arrangements with insulating gas is described, wherein the at least two contact arrangements each have a first contact piece and a second contact piece which can move relative to each other in order to form an electrical connection in a state in which the first contact piece and the second contact piece touch each other, and to form an insulating gap in a state in which they are isolated from each other, wherein the blasting arrangement has at least two blasting volumes, wherein a first contact arrangement can be supplied with insulating gas by a first blasting volume, and wherein a second contact arrangement can be supplied with insulating gas by a second blasting volume.

Such an embodiment enables a simple structure with a defined blasting of a plurality of contact arrangements.

A switching arrangement with a plurality of at least two contact arrangements is provided to interrupt a switching gap or to bridge a switching gap. The switching arrangement can here have at least one first contact arrangement and a second contact arrangement. Each of the contact arrangements here has a first and a second switching contact piece. A switching gap can extend at least temporarily between the switching contact pieces of a switching contact. The impedance of the switching gap can be modified in order to switch the switching arrangement on and off. For this purpose, the switching gap can, for example, be bridged mechanically or its impedance modified in a different way. For example, bridging the switching gap can also be performed by means of an arc. In a simple case, a relative movement of the switching contact pieces of the respective switching contact can be provided in order to bridge the switching gap. At least one of the switching contact pieces can here be arranged so that it is movable, whereas the other switching contact piece of the respective contact arrangement can be arranged so that it is stationary. It can, however, also be provided that both the first and the second switching contact piece are designed so that they can move or be driven such that, in order to initiate a switching procedure, a movement is coupled into both the first switching contact piece and the second switching contact piece.

In any case, the first contact piece and the second contact piece can move relative to each other in order to form an electrical connection in a state in which the first contact piece and the second contact piece touch each other, and to form an insulating gap in a state in which they are isolated from each other.

The plurality of contact arrangements can be arranged so that they are electrically insulated from one another. It is thus possible to switch electrical potentials/currents which differ from each other in the switching contacts. Different types of apparatus can be used as a switching arrangement. Thus, for example, isolating switches and grounding switches can function as a switching arrangement. It can, however, also be provided that load switches or circuit breakers are used as a switching arrangement.

It can advantageously be provided that the switching contact pieces of the respective contact arrangement are combined arc and main contacts. It is consequently made possible for the switching contact pieces to have a simple structure. Portions of the contact pieces may optionally be equipped with an erosion-resistant material. Lightweight and low-impedance contact pieces can be formed as a result. A contact piece can be designed, for example, in the form of a socket or bolt. A bolt-shaped contact piece can, for example, also be designed with an essentially tubular shape.

By virtue of the use of at least two contact arrangements, the switching arrangement is capable of carrying out a switching operation in a multi-phase system. The power to be transmitted can be increased by using a plurality of contact arrangements.

The blasting arrangement makes it possible to blast the switching gap with a fluid flow, and possibly remove any impurities situated in the switching gap, during bridging of a switching gap and/or during creation of a switching gap. The blasting arrangement can here preferably propel a gaseous fluid. It can, however, also be provided that the blasting arrangement propels a liquid fluid. In particular fluorine-containing fluids are suited for flowing over the sets of contacts. Thus, for example, fluorinated ketone or fluorinated nitrile can be used as fluids. However, natural fluids such as nitrogen, carbon dioxide, oxygen can also be used as a constituent of the insulating gas or synthetic air for blasting. Fluid mixtures which have at least one of these components can also be used. The blasting arrangement can here have a different design from the switching contact pieces such that power adaptation of the blasting arrangement can be performed without there being any need here to engage in the structure of a contact piece.

With regard to the blasting arrangement, it is provided that the blasting arrangement has at least two blasting volumes, wherein a first contact arrangement can be supplied with insulating gas by a first blasting volume, and wherein a second contact arrangement can be supplied with insulating gas by a second blasting volume.

In other words, the switching arrangement described here proposes to provide a plurality of blasting volumes, the number of which is matched to the number of contact arrangements or to the number of phases in the electrical circuit. Thus, a blasting volume which supplies an insulating gas to all the contact arrangements is not provided, as known from the prior art, and instead a plurality of blasting volumes are provided which correspond to the number of contact arrangements.

It can consequently be made possible that, in contrast to providing just one blasting volume which is connected to the contact arrangements by means of blasting ducts, such blasting ducts can be omitted altogether. This can simplify the structure and thus may make the production of the switching arrangement more cost-effective.

Advantages compared with a blasting volume which supplies all the contact arrangements directly and thus extends over all the contact arrangements are moreover afforded. Although with this embodiment it is possible to dispense with the ducts by virtue of its spatial extent and to effect uniform blasting of all the contact pieces directly, difficulties arise here in terms of the switching speed. An unreliably high vacuum in the blasting system is created when switching on by virtue of the required size of the design of the blasting volume. This can be counteracted by a flap/valve mechanism. However, this in turn entails the provision of a further arrangement, the flap/valve mechanism. It is also possible to dispense with such an embodiment within the sense of the present invention.

The structure and the mounting of the switching arrangement can thus be simplified according to the invention by reducing the components.

Correct dimensioning of the blasting volume, configured for example as a blasting piston, moreover seems important. The size can advantageously be adapted precisely to the cut-off currents but also can correspondingly be minimized for switching on too. This is in particular the case when the above described special measures such as flow ducts or flap mechanisms are undesirable. Such dimensioning of the blasting volumes is possible without any problems within the scope of the present invention, which can afford a further significant advantage with regard to the structure and working of the switching arrangement.

It can furthermore be prevented by the present invention that there is any influence on the switching speed.

An object of the switching arrangement according to the present invention is to reproduce a blasting system. As a result, each contact arrangement can be supplied separately with insulating gas. At the same time, the blasting volume can have a relatively small design because there is no need in this concept for the distances between the contact arrangements to be bridged, for example by the spatial extent of the blasting volume.

The present invention can be particularly advantageous if a number of more than two contact arrangements is provided. It can thus be particularly advantageous if in addition at least a third blasting volume and a third contact arrangement are provided, wherein the third contact arrangement can be supplied with insulating gas by the third blasting volume.

It can moreover be preferred that the first contact arrangement can be supplied with insulating gas exclusively by the first blasting volume, and that the second contact arrangement can be supplied with insulating gas exclusively by the second blasting volume, and that optionally, i.e. where present, the third contact arrangement can be supplied with insulating gas exclusively by the third blasting volume. In other words, a blasting volume is thus assigned to each contact arrangement, wherein the supply of isolating gas can be effected exclusively by this blasting volume.

In this embodiment, the passage of gas from one blasting volume into another blasting volume cannot take place. Particularly defined blasting can consequently be enabled because it is ensured that the volume of insulating gas flows only to the contact arrangement assigned to the blasting volume and not to another contact arrangement, which enables a defined flow of insulating fluid. Furthermore, for each of the contact arrangements, a volume of insulating gas specified therefor is always made available which can be conveyed directly to the contact arrangement. Increased safety can be ensured as a result. A particularly simple structure can thus ultimately be ensured.

Furthermore, the respective blasting volume can be adapted exactly to the respective contact arrangement, for example with regard to the insulating gas or with regard to the volume, which enables particularly secure and effective operation. In particular, it can thus be provided that at least partly different insulating gases exist in the blasting volumes which are present or that the blasting volumes at least partially having a different size.

It can furthermore be provided that the blasting arrangement has a volume-displacement piston-and-cylinder arrangement, wherein at least one contact piece from the first contact arrangement and the second contact arrangement and optionally the third contact arrangement is arranged so that it is stationary on the piston-and-cylinder arrangement. It can accordingly be provided that a separate piston-and-cylinder arrangement, which is formed in particular so that it is gas-tight with respect to each of the other piston-and-cylinder arrangements, is provided for each contact arrangement.

A volume-displacement piston-and-cylinder arrangement has the advantage that a pressure difference in the piston-and-cylinder arrangement can be generated repeatedly such that a fluid flow can be generated in a simple fashion. A pressure difference can be generated by a relative movement of a piston relative to a surrounding cylinder. The relative movement of a piston and a cylinder of the piston-and-cylinder arrangement can here be synchronized with a switching procedure (for example, a switching movement) of the contact arrangement such that a pressure difference of a fluid is generated in the piston-and-cylinder arrangement only as required. The maintenance of fluid at an elevated pressure over relatively long periods of time is prevented as a result.

At least one of the contact pieces, in particular functionally identical contact pieces of the first and second switching contact or of the first and second contact arrangement can be arranged on the blasting arrangement. It is consequently made possible, on the one hand, to position the blasting arrangement adjacent to the contact arrangements and, on the other hand, to vary the form of the blasting arrangement independently of the contact arrangement. As required, the contact pieces can be arranged on the piston or on the cylinder or on both the piston and the cylinder, in particular can be carried by them.

It can furthermore be preferred that the first blasting volume, the second blasting volume, and optionally the third blasting volume are formed so that they are gas-tight relative to one another.

In this embodiment, the passage of gas from one blasting volume to another blasting volume can thus not take place. Particularly defined blasting can consequently be enabled because it is ensured that the volume of insulating fluid flows only to the contact arrangement assigned to the blasting volume and not to another contact arrangement, which enables a defined flow of insulating fluid. Furthermore, for each of the contact arrangements, a volume of insulating gas specified therefor is always made available which can be conveyed directly to the contact arrangement. Increased safety can be ensured as a result. A particularly simple structure can thus ultimately be ensured.

It can furthermore be preferred that at least one contact piece is placed onto a wall of the piston-and-cylinder arrangement, in particular is inserted into a wall of the piston-and-cylinder arrangement.

A wall into/onto which a contact piece is inserted/placed can preferably delimit the blasting volume of the piston-and-cylinder arrangement. The contact piece inserted/placed into/onto the wall is consequently positioned close to the blasting volume such that the transporting of a flowing fluid from the blasting volume to the contact pieces can be implemented over short distances. The contact piece can thus be supported at least partly by the piston-and-cylinder arrangement, in particular by a wall.

It can furthermore be advantageous that a contact piece of the first contact arrangement, a contact piece of the second contact arrangement, and optionally a contact piece of the third contact arrangement are arranged on a common wall element, wherein the common wall element forms a wall of the first piston-and-cylinder arrangement, the second piston-and-cylinder arrangement, and optionally the third piston-and-cylinder arrangement.

This embodiment can in particular be advantageous if it is intended that a switching operation takes place in a unified fashion at the provided contact arrangements, i.e. directly at the same time. In this embodiment, conveying of the insulating fluid can thus be controlled jointly although the provided blasting volumes can also be separated from one another.

It can alternatively be advantageous that a contact piece of the first contact arrangement, a contact piece of the second contact arrangement, and optionally a contact piece of the third contact arrangement are arranged in each case on a separate wall element, wherein the separate wall elements in each case form a separate wall of the first piston-and-cylinder arrangement, the second piston-and-cylinder arrangement, and optionally the third piston-and-cylinder arrangement.

In this embodiment, a particularly high degree of flexibility can be enabled with respect to switching operations. This is because the abovementioned advantages can be provided effectively even when it is intended for the switching operations of the contact arrangement to take place independently of one another. In this embodiment, the controlling of the conveying of the insulating fluid into a contact arrangement is independent of the other switching operations.

It can furthermore be provided that at least one blasting volume is filled at least partly with synthetic air.

It has been shown that in particular synthetic air as an insulating medium can have very good properties for example in terms of quenching an arc and the reduced formation of soot. It is moreover possible to dispense with the use of SF6 by using synthetic air. It has, however, also been shown that, when using synthetic air, it may not be possible for a contact arrangement, for example designed as a ground electrode, to be switched off without any problems because the generation of an arc may not always be possible not only owing to the speed and the distance, for example, of switching pins from female contacts or fundamentally of switching pieces. In particular when using synthetic air, blasting can therefore be expedient such that the advantages of the invention are applied here particularly effectively.

With regard to further advantages and technical features of the switching arrangement, reference is hereby made to the description of the gas-insulated switchgear, the drawing, and the description of the drawing.

Gas-insulated switchgear having a switching arrangement is moreover described, wherein the switching arrangement is configured as described elsewhere.

Such gas-insulated switchgear enables in particular the advantages which have already been described above. In particular, a simple structure and simple mounting at high switching speeds can be enabled by the provision of a described switching arrangement.

With regard to further advantages and technical features of the gas-insulated switchgear, reference is hereby made to the description of the switching arrangement, the drawing, and the description of the drawing.

Further details, features, and advantages of the subject of the invention result from the subclaims and from the following description of the drawing and the associated example.

BRIEF DESCRIPTION OF THE FIGURES

FIG. 1 schematically shows a view in section of an embodiment of a switching arrangement according to the invention from the side.

DETAILED DESCRIPTION OF THE INVENTION

A view in section of an embodiment of a switching arrangement according to the invention from the side is shown in FIG. 1. Such a switching arrangement 10 can in particular be part of gas-insulated switchgear.

The switching arrangement 10 according to FIG. 1 comprises a plurality of at least two contact arrangements 12. Specifically, three contact arrangements 12*a*, 12*b*, 12*c* are shown in FIG. 1, wherein this embodiment is to be understood as not restrictive. The contact arrangements 12*a*, 12*b*, 12*c* each comprise a first contact piece 14*a*, 14*b*, 14*c* and a second contact piece 16*a*, 16*b*, 16*c* which can move relative to each other in order to form an electrical connection in a state in which the first contact piece 14*a*, 14*b*, 14*c* and the second contact piece 16*a*, 16*b*, 16*c* touch each other and a state in which they form an insulating gap when they are isolated from each other. A state in which the contact pieces 14*a*, 14*b*, 14*c* and 16*a*, 16*b*, 16*c* touch each other is shown in FIG. 1. More precisely, the first contact pieces 14*a*, 14*b*, 14*c* are formed as contact pins which are arranged in a socket, wherein the socket forms the second contact piece 16*a*, 16*b*, 16*c*.

A blasting arrangement 18 is moreover provided which serves to blast the contact arrangements 12*a*, 12*b*, 12*c* with insulating gas 20, for example with synthetic air. The blasting arrangement 18 has three blasting volumes 22*a*, 22*b*, 22*c*, wherein the contact arrangements 22*a*, 22*b*, 22*c* can each be supplied selectively with insulating gas 20 from a blasting volume 22*a*, 22*b*, 22*c*. More precisely, a blasting volume 22*a*, 22*b*, 22*c* is assigned to each contact arrangement 12*a*, 12*b*, 12*c* such that each contact arrangement 12*a*, 12*b*, 12*c* can be supplied with insulating gas 20 exclusively by a blasting volume 22*a*, 22*b*, 22*c*. The different blasting volumes 22*a*, 22*b*, 22*c* are here formed so that they are gas-tight relative to one another such that the exchange of gas between the individual blasting volumes 22*a*, 22*b*, 22*c* is not possible.

With regard to the blasting arrangement 18, FIG. 1 shows that the blasting arrangement 18 has a volume-displacement piston-and-cylinder arrangement 24*a*, 24*b*, 24*c*, wherein the second contact pieces 16*a*, 16*b*, 16*c* of the respective contact arrangement 12*a*, 12*b*, 12*c* are arranged so that they are stationary on the piston-and-cylinder arrangement 24*a*, 24*b*, 24*c*. More precisely, it is provided that the second contact pieces 16*a*, 16*b*, 16*c* are placed on a wall 26 of the piston-and-cylinder arrangement 24*a*, 24*b*, 24*c*, in particular is inserted into a wall 26 of the piston-and-cylinder arrangement 24*a*, 24*b*, 24*c*. A common wall 26 for all three piston-and-cylinder arrangements 24*a*, 24*b*, 24*c* is thus provided.

The respective blasting volumes 22*a*, 22*b*, 22*c* is moreover connected to the corresponding contact arrangement 12*a*, 12*b*, 12*c* by a blowout duct 28*a*, 28*b*, 28*c* through which the insulating gas 20 can flow from the blasting volume 22*a*, 22*b*, 22*c* to the corresponding contact arrangement 12*a*, 12*b*, 12*c*.

Such a switching arrangement 10 can work as follows.

When isolating the contact arrangements 12*a*, 12*b*, 12*c*, the second contact pieces 16*a*, 16, 16*c* are shifted, together with the wall 24, to the right in FIG. 1 such that the blasting volumes 22*a*, 22*b*, 22*c* are reduced. This has the result that the insulating gas 20 flows through the blowout duct 28*a*, 28*b*, 28*c* to the corresponding contact arrangement 12*a*, 12*b*, 12*c*. A discharge opening of the blowout duct 28*a*, 28*b*, 28*c* can here open out at the switching gap. Efficient blasting of the switching gap can be performed as a result. It is thus, for example, possible to cool the switching gap or to evacuate foreign matter such as the products of erosion, etc from the switching gap and to promote dielectric strengthening of the switching gap.

Kinematics 30 by means of which rear walls 32*a*, 32*b*, 32*c* of the piston-and-cylinder arrangement 24*a*, 24*b*, 24*c* can be displaced in order to vary the blasting volumes 22*a*, 22*b*, 22*c* is moreover shown.

The invention claimed is:

1. A switching configuration, comprising:

a plurality of contact configurations having at least two said contact configurations, each of said contact configurations containing contact pieces including a first contact piece and a second contact piece which can move relative to each other in order to form an electrical connection in a state in which said first contact piece and said second contact piece touch each other, and to form an insulating gap in a state in which said first contact piece and said second contact piece are isolated from each other;

a blasting configuration for blasting said contact configurations with insulating gas, said blasting configuration having a plurality of blasting volumes, a first contact configuration of said contact configurations being supplied with said insulating gas by a first blasting volume of said blasting volumes, and a second contact configuration of said contact configurations being supplied with said insulating gas by a second blasting volume of said blasting volumes; and said blasting configuration having a volume-displacement piston-and-cylinder configuration, at least one contact piece from said first contact configuration and from said second contact configuration being arranged so that said at least one contact piece is stationary on said volume-displacement piston-and-cylinder configuration.

2. The switching configuration according to claim 1, wherein a third blasting volume of said blasting volumes and a third contact configuration of said contact configurations are provided, wherein said third contact configuration being supplied with said insulating gas by said third blasting volume.

3. The switching configuration according to claim 2, wherein said first contact configuration is supplied with said insulating gas exclusively by said first blasting volume, and that said second contact configuration is supplied with said insulating gas exclusively by said second blasting volume.

4. The switching configuration according to claim 3, wherein said third contact configuration is supplied with said insulating gas exclusively by said third blasting volume.

5. The switching configuration according to claim 2, wherein said volume-displacement piston-and-cylinder configuration has a wall, and said at least one contact piece is placed onto said wall of said volume-displacement piston-and-cylinder configuration.

6. The switching configuration according to claim 5, wherein:

said wall is a common wall element;

said volume-displacement piston-and-cylinder configuration is one of a plurality of piston-and-cylinder configurations including a first piston-and-cylinder configuration and a second piston-and-cylinder configuration;

a contact piece of said contact pieces of said first contact configuration and a contact piece of said contact pieces of said second contact configuration are disposed on said common wall element; and said common wall element forms a wall of said first piston-and-cylinder configuration and said second piston-and-cylinder configuration.

7. The switching configuration according to claim 5, wherein:

said wall has separate wall elements;

a contact piece of said contact pieces of said first contact configuration and a contact piece of said contact pieces of said second contact configuration are disposed in each case on one of said separate wall elements; and said separate wall elements in each case form a separate wall of said first piston-and-cylinder configuration and said second piston-and-cylinder configuration.

8. The switching configuration according to claim 5, wherein said at least one contact piece is inserted into said wall of said volume-displacement piston-and-cylinder configuration.

9. The switching configuration according to claim 5, wherein:

said wall is a common wall element;

said volume-displacement piston-and-cylinder configuration is one of a plurality of piston-and-cylinder configurations including a first piston-and-cylinder configuration, a second piston-and-cylinder configuration, and a third piston-and-cylinder configuration;

a contact piece of said contact pieces of said first contact configuration, a contact piece of said contact pieces of said second contact configuration, and a contact piece of said contact pieces of said third contact configuration are disposed on said common wall element; and said common wall element forms a wall of said first piston-and-cylinder configuration, said second piston-and-cylinder configuration, and said third piston-and-cylinder configuration.

10. The switching configuration according to claim 5, wherein:

said wall has separate wall elements;

a contact piece of said contact pieces of said first contact configuration, a contact piece of said contact pieces of said second contact configuration, and a contact piece of said contact pieces of said third contact configuration are disposed in each case on one of said separate wall elements; and said separate wall elements in each case form a separate wall of said first piston-and-cylinder configuration, said second piston-and-cylinder configuration, and said third piston-and-cylinder configuration.

11. The switching configuration according to claim 2, wherein said first blasting volume, said second blasting volume, and said third blasting volume are formed so that they are gas-tight relative to one another.

12. The switching configuration according to claim 2, wherein:

said blasting configuration has a volume-displacement piston-and-cylinder configuration;

at least one of said contact pieces from said first contact configuration, from said second contact configuration, and from said third contact configuration is disposed so that said at least one contact piece is stationary on said volume-displacement piston-and-cylinder configuration.

13. The switching configuration according to claim 1, wherein said first blasting volume and said second blasting volume are formed so that they are gas-tight relative to one another.

14. The switching configuration according to claim 1, wherein at least one of said blasting volumes is filled at least partly with synthetic air.

15. A gas-insulated switchgear, comprising:

said switching configuration according to claim 1.

* * * * *